June 3, 1930.   T. J. McCORMICK   1,761,735
TIRE COVER
Filed Feb. 1, 1928   2 Sheets-Sheet 2
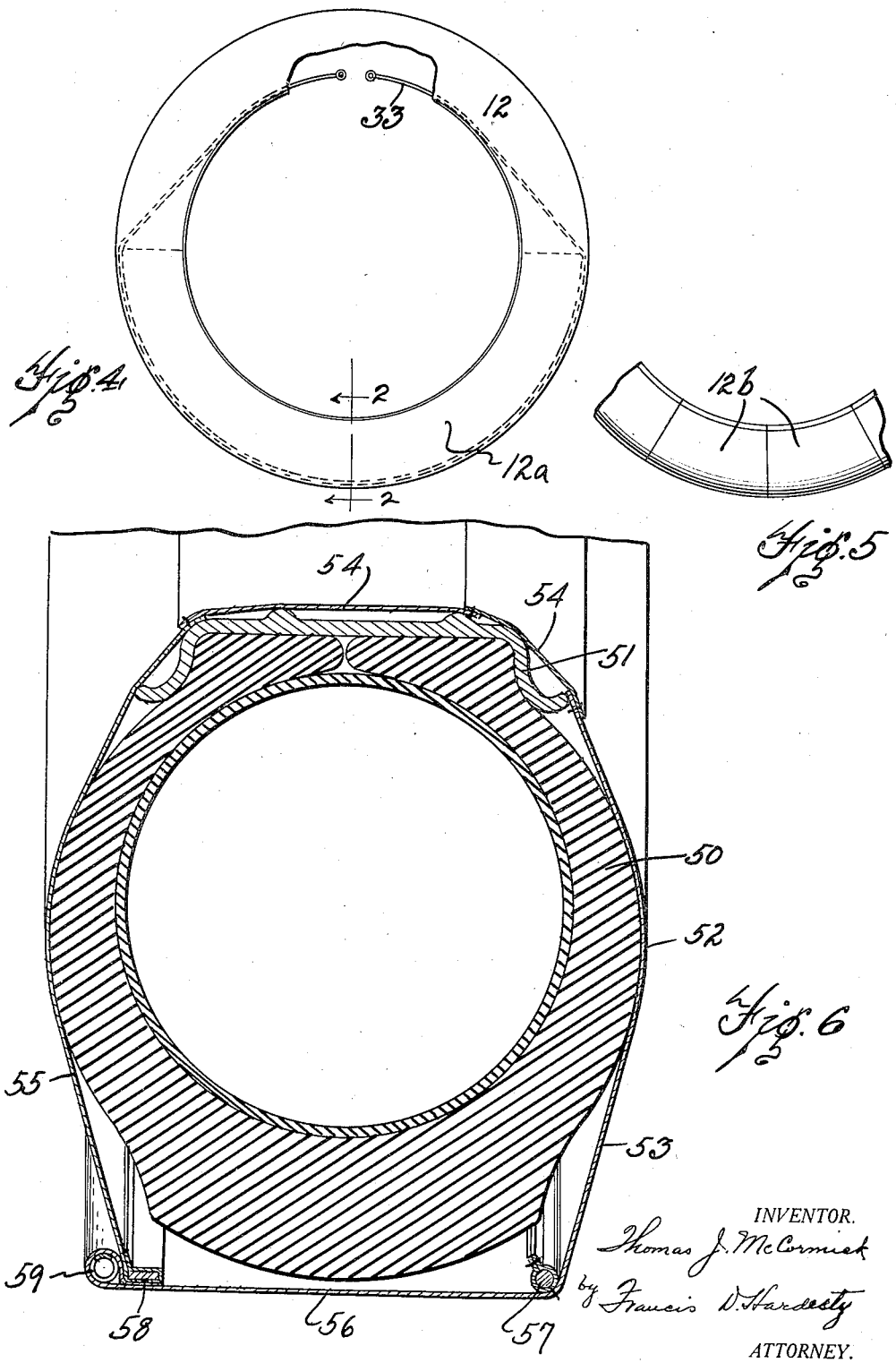
INVENTOR.
Thomas J. McCormick
by Francis D. Hardesty
ATTORNEY.

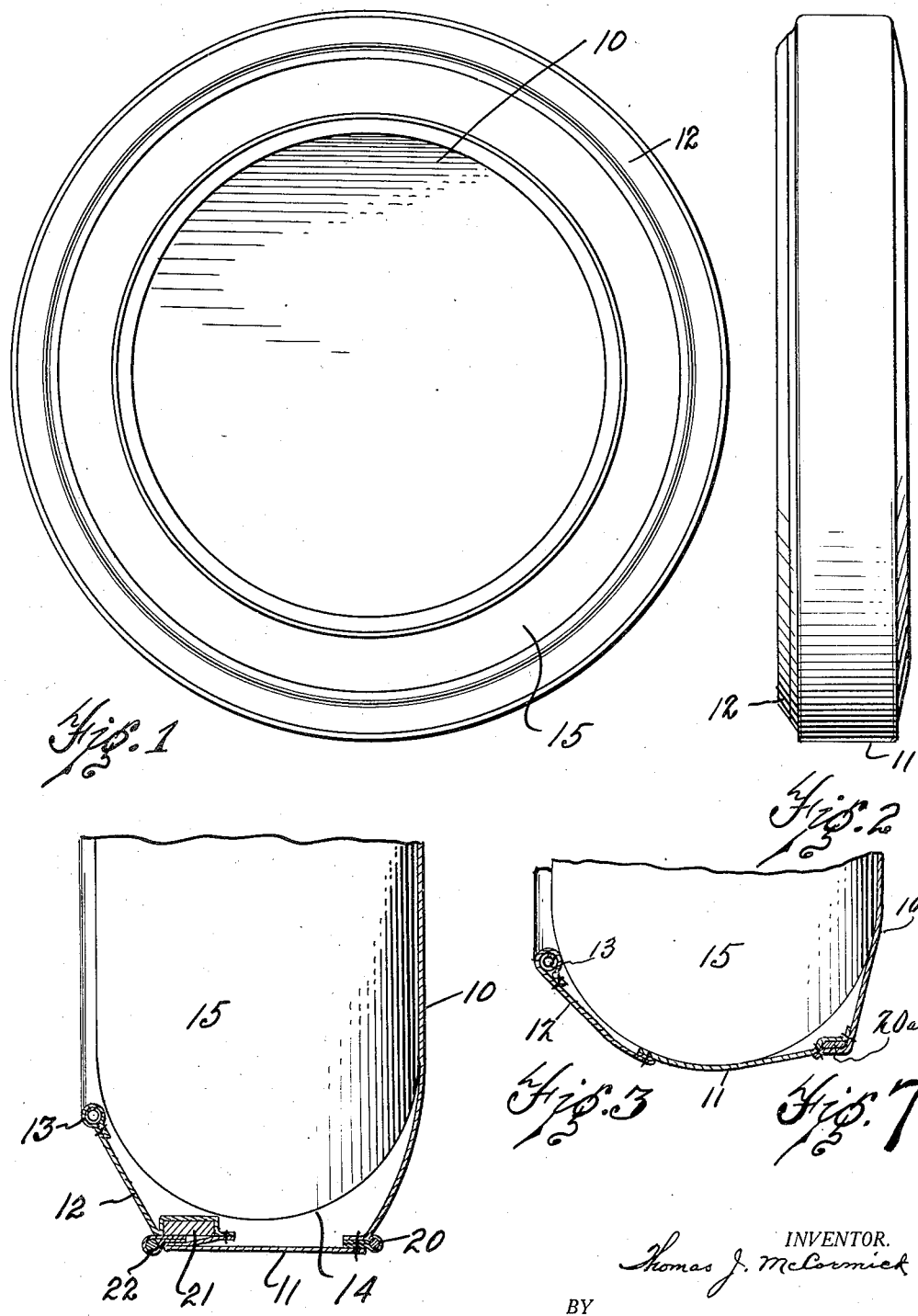

Patented June 3, 1930

1,761,735

UNITED STATES PATENT OFFICE

THOMAS J. McCORMICK, OF DETROIT, MICHIGAN

TIRE COVER

Application filed February 1, 1928. Serial No. 251,039.

The present invention relates to fabric tire covers, adapted to be used to protect spare tires of automobiles against the deteriorating influence of sunlight and weather.

Heretofore, on account of the variation in actual measurements of tires of different makes, although supposedly of the same size, it has been necessary for tie covers to be made for each particular make, if a really good fit was required. Further, the number of tire sizes is quite great and in addition to the difficulty just indicated, each particular tire size requires its own size cover.

Among the objects of the present invention, is a tire cover which will not only adapt itself to the variation in size due to the difference in origin of the standard size tire, but may be used for tires supposedly of different standard sizes. In other words, this object of the invention is intended to permit the use of a very few sizes of tire covers on a great many sizes of tires and yet present a good appearance or the appearance of a good fit.

Another object of the invention is a tire cover which is much more easily put on and taken off of the tire than those heretofore used.

In the conventional tire cover of the types about to be described, it is often quite difficult, especially, for one not expert in the operation, to put on a tire cover so that it will lie smooth upon the tire and present a good appearance.

The present invention is intended to obviate this difficulty and enable even the most inexpert operator to apply the cover to his tire and have it present as good appearance as though carefully put on by a more expert operator.

Other objects will readily appear to those skilled in the art, upon reference to the following description and the accompanying drawings in which:—

Figure 1, is an elevation of a tire with the cover thereon, the view being taken as though from the left of Figure 3;

Figure 2, is a side view of Figure 1;

Figure 3, is a sectional view of the cover of Figure 1 on an enlarged scale, showing its construction more in detail;

Figure 4, is a view similar to Figure 1 but showing a modified form of cover;

Figure 5, is a fragmentary view showing a further modification, and

Figure 6, is a sectional view of a tire and cover showing the invention as applied to a cover of the "double wrapped" type;

Figure 7, is a section of another modified form.

The cover shown in Figures 1 to 5 is what is known in the trade as the "drum" type cover and consists of a circular piece of fabric 10 having sewed to its edge a strip 11 called the tread strip, which has in turn sewed to its edge a second strip 12 having in its free edge an endless coil spring 13 or other suitable contractable and expansible element or cord which may be enlarged in diameter sufficiently to pass over the tread 14 of the tire 15. In the ordinary drum cover, the diameter of the circular face piece 10 is made to be slightly less than the diameter of the tire tread so that the tread strip 11 will stretch over and lie snugly against the tread of the tire and be drawn tightly over the tire by a spring at 13, which, in the ordinary cover, is a very strong spring. If the circular member 10 and tread strip 11 are not properly produced for the particular tire, it is extremely difficult to make the cover fit smooth over the tire and produce a good appearance. Further, the spring 13 must be sufficiently strong to put the strip 11 and piece 10 under tension in order to maintain this smoothness.

In the present design of cover, such as in Figure 3, the circular piece 10 is cut if desired to a diameter which is somewhat larger than the diameter of the largest size tire which it is intended to cover. In the form shown in Figure 7 the piece 10 may be somewhat smaller. In the seam which joins piece 10 and the tread strip 11 is sewed, with a suitable covering, a spring steel distending element which may be a wire 20 of small diameter or spring ring 20ª (Fig. 7) and it is preferred also to sew on the seam between strip 11 and piece 12 a second distending element shown as a spring steel ring 21, preferably rectangular in cross section of substantially the same diameter as the ring 21; if desired, a piping 22 may be used to match the piping formed around wire 20. Further, instead of a very strong spring at 13 a spring is used which is quite weak having only sufficient strength to act as a means to prevent the cover coming off of the tire too readily.

It should be noted that if desired a rectangular or other shaped distending element may be used in the place of wire 20 and that, while two distending elements are desirable, it is in contemplation to use only one at the edge of piece 10 and omit the other between strips 11 and 12.

With such a cover, it is not necessary that the tread 14 of the tire even contact with the tread strip 11 and in most instances, such contact will not occur. Only in the largest sizes of tire for which a single cover may be used will the strip and tread 14 touch.

Instead of using a continuous or endless spring at 13 in the present cover, the spring may be omitted and a piece of wire which passes around in the hem at this point used in lieu thereof. Such a construction is shown in Figures 4 and 5. Figure 4, shows such a cover using a wire 33 in place of spring 13 and shows the cover in position to be put on or taken off of a tire.

This cover will be made so that the upper half of the inside movable piece 12 does not open up in order to put in or take out a tire. The ends of the wire 33 will overlap when the cover is in closed position and may be suitably fastened but when the wire ends are pulled together to increase the diameter of the ring, the lower half of the cover will be forced open and the tire readily put into the cover through the open lower half. In putting such a cover on, of course, the upper half will be dropped down over the upper part of the tire and then the lower half of the cover pushed over the lower part of the tire. In order to facilitate this partial opening, the movable strip may be made in sections 12ᵇ, as shown in Figure 5.

In Figure 6, the invention is shown as applied to the so-called "double wrapped" cover and which entirely covers the tire and rim in what is, in effect, an annular tube.

A section of a tire on its rim and enclosed in the cover is shown in this Figure 6, the tire being indicated at 50, the rim at 51, and the cover indicated as a whole by 52. In this form of cover, the annular trough or channel in which the tire and rim lies is made of an outer face strip 53; narrow strips 54 adapted to lie on the under side of the rim; and a rearward face strip 55. The tread strip or channel cover 56 in the present form of cover may be a part of the face piece 53 or may be a separate strip sewed thereto. In either form, a flexible or nonflexible spring ring 57 will be included in the cover at the junction of the tread strip 56 and face piece 53 and a second spring flexible or nonflexible ring 58 will be sewed into the outer edge of the inner face piece 55. In the free edge of the tread strip 56 will be sewed a light endless spring 59 which contracts the edge of the tread strip over behind the spring ring 58 when the cover is on the tire.

Figure 7 shows a form of cover in which a small rectangular ring 20ᵃ is used in the place of ring 20 and in which the face piece 10ᵃ is somewhat smaller in diameter than the tire tread.

In all of the forms of cover shown and described, it will be noted that the fabric is held in a smoothly distended position by the use of metal rings which are springy and quite flexible if desired. It will also be noted that in no form is the contracting spring of such strength as to offer material resistance to its being extended so as to pull over the tread of the tire. This also, of course, means that the strength of this spring member is not needed to hold the fabric portion tight or draw it against the tire so as to remove any wrinkles or puckers.

In all of the forms of cover described, the latter may be considered as a fabric case built upon a suitable distending frame of metal, fiber, reed or the like and having a lid member which is held over the tire to prevent its displacement from the casing.

While the rings 21, 57, and 58 have been described as of flexible spring steel, it is to be understood that these rings can be more or less rigid in character or may range from quite stiff rings to quite flexible rings without departing from the spirit of the invention.

Further, while rings 27 and 57 have been shown as round in section, this is not necessarily the case as it is obvious that other shapes may be used and the same may be said of rings 21 and 58.

Now having described the invention and the preferred form of embodiment thereof, it is to be understood that the said invention is to be limited, not to the specific details herein set forth but, only by the scope of the claims which follow.

I claim:—

1. A tire cover comprising a circular face piece of fabric having a tread strip sewed thereto with a retaining rear face strip sewed to said tread strip, distending rings secured to said face piece and tread strip and means for contracting the free edge of said retaining strip.

2. In a tire cover having a face portion and a tread portion secured directly thereto, a ring attached to said cover adjacent the line of juncture of said portions, said ring being adapted to tension and maintain said face portion smooth.

3. In a tire cover having a face portion and a tread portion secured directly thereto, a ring attached to said cover adjacent the line of juncture of said portions, said ring being stiff enough to resist diameter reducing forces, so as to tension and maintain said face portion smooth.

4. In a tire cover having a face portion and a tread portion secured directly thereto, a ring attached to said cover adjacent the line of juncture of said portions, the ring diameter being large enough to maintain the face piece taut on tires nominally of the same size but differing slightly in diameter.

5. In a tire cover having a face portion and a tread portion secured directly thereto, a ring attached to said cover adjacent the line of juncture of said portions, the ring diameter being large enough to maintain the face piece taut and to provide a space between the tire and the ring.

THOMAS J. McCORMICK.